US006662511B1

(12) United States Patent
Alty

(10) Patent No.: US 6,662,511 B1
(45) Date of Patent: *Dec. 16, 2003

(54) DEVICES AND METHODS FOR SECURING AN OBJECT TO A FIRST STRUCTURE THROUGH A HOLE IN A SECOND STRUCTURE

(76) Inventor: Louis Karl Alty, 2258 Richland Dr., Corpus Christi, TX (US) 78418

( * ) Notice: Subject to any disclaimer, the term of this patent is extended or adjusted under 35 U.S.C. 154(b) by 0 days.

This patent is subject to a terminal disclaimer.

(21) Appl. No.: 09/723,566

(22) Filed: Nov. 28, 2000

Related U.S. Application Data

(63) Continuation-in-part of application No. 09/359,187, filed on Jul. 22, 1999.

(51) Int. Cl.$^7$ .............................................. E02D 27/00
(52) U.S. Cl. ...................... 52/202; 411/178; 411/397; 411/383; 411/384; 52/298; 52/295; 52/351
(58) Field of Search ................................ 411/178, 397, 411/383, 384; 52/298, 295, 351

(56) References Cited

U.S. PATENT DOCUMENTS 309,817 A * 12/1884 Bartlow
824,983 A * 7/1906 Parrington
5,470,184 A * 11/1995 Chandler ..................... 411/377
6,261,039 B1 * 7/2001 Reed ........................... 411/178
6,293,744 B1 * 9/2001 Hempfling et al. ...... 411/372.5
6,295,773 B1 * 10/2001 Alty ............................. 52/202

* cited by examiner

Primary Examiner—Carl D. Friedman
Assistant Examiner—Steve Varner
(74) Attorney, Agent, or Firm—George S. Gray

(57) ABSTRACT

A device is provided which enables an object such as a window protection device to be secured to a structure, where the device passes through a hole in one or more structures located between the object, and the structure to which attachment is desired. The device can be screwed, or otherwise attached, to wood structural framing which is concealed beneath veneer, such as bricks and other masonry. The other end of the device receives a tool which allows such an installation, and also the removal of the device. The other end also receives a fastener, such as a bolt, which secures the material or the track to the end of the device, the end of the device being substantially flush with the exterior veneer surface. The end of the device is flared to seal the hole in the veneer and increase the stability of the device in the hole.

19 Claims, 4 Drawing Sheets

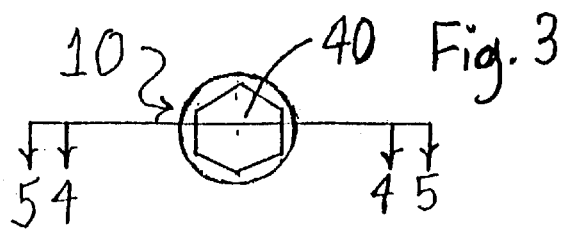
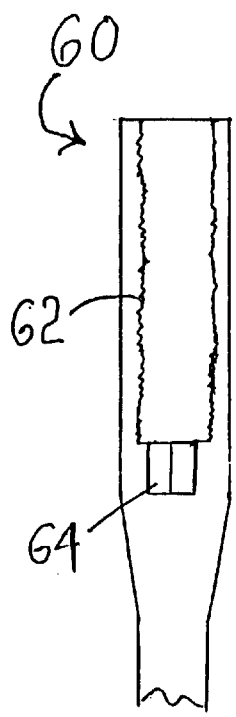
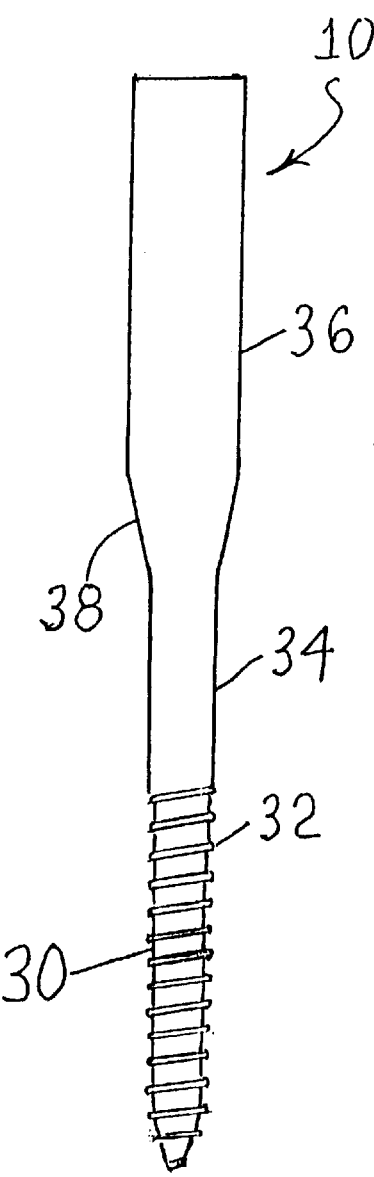
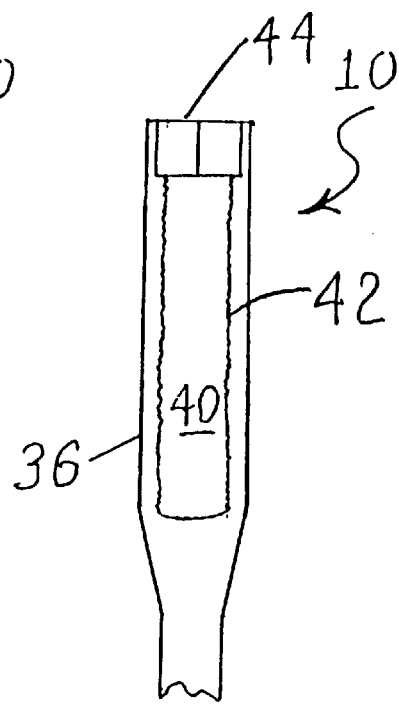
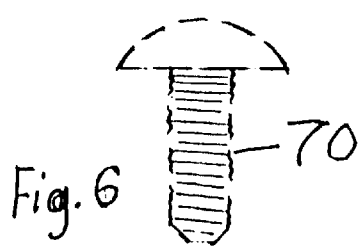

DEVICES AND METHODS FOR SECURING AN OBJECT TO A FIRST STRUCTURE THROUGH A HOLE IN A SECOND STRUCTURE

CROSS REFERENCE TO RELATED APPLICATIONS

This is a continuation in part application from the parent application having the application Ser. No. 09/359,187, filed Jul. 22, 1999, by the above-referenced inventor. Applicant claims the filing date of such application.

BACKGROUND OF THE INVENTION

Severe weather often dictates that window openings be covered by plywood, other sheets of protective material, or shutters. For buildings constructed using various veneers, this activity is often complicated by the lack of a satisfactory exterior surface for attaching the protective material. In some cases, builders are forced to add exposed, forward facing wood framing for this purpose—a feature many owners find aesthetically undesirable.

Window openings in veneer constructions are often proximate structural framing, of wood or metal, behind the veneer material. This framing, if accessible, is structurally suitable for attaching protective material or shutter attachment hardware, such as shutter hinges or tracks for rolldown shutters. Complicating the use of such framing for this purpose is its concealed location and the desirability of avoiding a significant load on the veneer. Furthermore, when the protective material is removed, it is undesirable to leave unattractive attachment hardware exposed for viewing.

Existing devices for the protection of windows during severe weather are insufficient to address such issues. U.S. Pat. No. 5,661,935 provides a track assembly for mounting storm panels, and includes a rail which is installed as a recessed mount within the exterior wall of a house or a building. The device is shown to be fastened to the exterior surface of a building by several methods, none of which access the concealed structural framing. U.S. Pat. No. 5,335,452 provides a storm shutter apparatus having a panel member, a brace member, and an assembly for removably securing the end of the brace member to the building structure adjacent to the building opening. The assembly has an anchor member for attaching to the building, but no provision is made for accessing concealed structural framing. U.S. Pat. No. 4,193,235 discloses a window cover which is secured by wood screws directly screwed into the window frame. No provision is made for accessing the concealed structural framing. The device attaches to exposed window framing, and does not provide for access to concealed structural framing.

U.S. Pat. No. 2,541,675 provides an integrated window frame having a movable window sash in its lower portion and glass blocks in its upper portion. No access to the concealed structural framing is provided.

U.S. Pat. No. 4,027,443 provides a fire and impact resistant window assembly which has a multi-part centrally open marginal frame. U.S. Pat. No. 2,566,067 provides an auxiliary frame construction which is installed within the window frame of the building. Neither of these provide access to the concealed structural framing.

U.S. Pat. No. 5,673,883 provides a bar device which can be installed in a window opening to which a sheet of covering material can be secured to protect the window. The bar device includes a turnbuckle. Pads are forced against wall elements which define a window opening in order to secure the bar device in the window opening. No access is provided to concealed structural framing. U.S. Pat. No. 5,787,642 provides a storm shutter which can be permanently or temporarily mounted. Each shutter includes a rigid peripheral channel frame. No access is provided to concealed structural framing.

What is needed is a device for attaching the protective material to the concealed structural framing through holes in the veneer, and supporting substantially all of the weight to the exclusion of the veneer. The needed device should be simple to install and easily removable. When not in use, such a device and the veneer holes should be easily concealable from view.

SUMMARY OF THE INVENTION

My invention is a device and a method for attaching protective material to concealed structural framing through holes in the veneer. My device supports substantially all of the weight of the protective material to the exclusion of the veneer. My device is simply installed and easily removed. When not in use, my device and the veneer holes can be easily concealed from view.

According to one embodiment, there is provided a device for securing an object to a first structure through a hole in a second structure, comprising an elongated member, the member having a first end and a second end, the member first end having threads, the member second end having an interior, the member second end interior being shaped and sized for receiving a fastener within the member second end interior, the member second end interior also being shaped and sized to receive a tool, such that the member is rotatable, in either direction, by manipulation of the received tool.

According to a further embodiment, the member first end further has a diameter, the member first end diameter being approximately equal to the diameter of the fastener.

According to a further embodiment, the rigidity of the elongated member is such that, when the member is attached to the first structure the weight of the secured object is substantially removed from the second structure.

According to a further embodiment, the device further comprises the member first end, the first end further having a diameter, and the member second end, the second end further having a diameter, the second end diameter tapering to correspond with the first end diameter.

According to a further embodiment, the device further comprises the member first end, the first end further having a diameter, and the member second end, the second end further having a diameter, the second end diameter being larger than the first end diameter.

According to a further embodiment, the member first end threads are wood screw threads, the wood screw threads being positioned such that the member screws into the first structure when rotated.

According to a further embodiment, the member first end threads are lag screw threads, the lag screw threads being positioned such that the member screws into the first structure when rotated.

According to a further embodiment, the member first end threads are machine screw threads, the machine screw threads being positioned such that the member screws into the first structure when rotated.

According to a further embodiment, the device further comprises a plug, the plug being shaped and sized such that it is securely received by the second end interior when no fastener is in such second end interior.

According to a further embodiment, the device further comprises the plug, the plug having a cap, the cap being sized such that it substantially covers hole in the second structure when the plug is inserted into the second end interior.

According to a further embodiment, the tool is an Allen wrench.

According to a further embodiment, the tool is a ratchet tip.

According to a further embodiment, the tool has a substantially square ended tip for insertion.

According to a further embodiment, the tool is a screwdriver.

According to a further embodiment, the tool is a Phillips screwdriver.

According to a further embodiment, the tool is a square end screwdriver.

According to a further embodiment, the tool is a flathead screwdriver.

According to a further embodiment, the fastener is a threaded fastener.

According to a further embodiment, the fastener is a bolt.

According to a further embodiment, the fastener is a screw.

According to a further embodiment, the fastener is a non-threaded fastener.

According to a further embodiment, the member is metal.

According to a further embodiment, the member is stainless steel.

According to a further embodiment, the member is galvanized metal.

According to a further embodiment, the member is iron.

According to one application of the device, the secured object is plywood.

According to a further application, the secured object is a sheet of metal.

According to a further application, the secured object is a sheet of plastic.

According to a further application, the secured object is a sheet of fiberglass.

According to a further application, the secured object is a rolldown shutter track.

According to a further application, the secured object is a window covering track.

According to a further application, the secured object is a shutter hinge.

According to a further application, the secured object is a shutter mounting device.

According to a further application, the secured object is a shutter.

According to a further application, the first structure is wood.

According to a further application, the first structure is wood window framing.

According to a further application, the first structure is metal.

According to a further application, the second structure is brick.

According to a further application, the second structure is rock.

According to a further application, the second structure is stucco.

According to a further application, the second structure is synthetic stucco.

According to a further application, the second structure is Exterior Insulation and Finish System.

According to a further application, the second structure is masonry.

According to a further application, the second structure is wood siding.

According to a further application, the second structure is aluminum siding.

According to a further application, the second structure is metal siding.

According to a further application, the second structure is vinyl siding.

According to one embodiment, there is provided a device for securing an object to a first structure through a hole in a second structure, comprising: an elongated member, the member having a first end and a second end, the member second end having an interior; means for attaching the member to the first structure; means for securing an object to the member second end; and means for receiving a tool within the second end interior, such that the member is rotatable, in either direction, by manipulation of the tool.

According to one embodiment, there is provided for windows in veneer walls of the type having wood frame structure surrounding the window opening and concealed behind the veneer, a device for attaching a sheet of material to such wood frame structure through holes bored in the veneer, comprising an elongated member, the member having a first end and a second end, the member first end having threads for attaching the member to the wood frame structure, the member second end having an interior, the member second end being shaped and sized for receiving a fastener within the member second end interior, the member second end interior also being shaped and sized to receive a tool, such that the member is rotatable, in either direction, by manipulation of the received tool.

According to one embodiment, there is provided for windows in veneer walls of the type having wood frame structure surrounding the window opening and concealed behind the veneer, a device for attaching a sheet of material to such wood frame structure through holes bored in the veneer, comprising: an elongated member, the member having a first end and a second end, the member first end having threads for attaching the member to the wood frame structure, the member second end having an interior; means for securing the sheet of material to the member second end; and means for receiving a tool within the second end interior, such that the member is rotatable, in either direction, by manipulation of the tool.

According to one embodiment, there is provided a method for attaching one or more objects to a first structure where a second structure is between the first structure and the one or more objects, comprising the steps of: boring a plurality of holes through the second structure, each hole aligned with a surface of the first structure; inserting an elongated member through each hole; fastening each member to the first structure, by inserting a tool into the interior of each such member and manipulating the tool such that each such member is rotated; removing the tool from the member; aligning one or more holes in each object to be attached with a fastened member; placing a fastener within each hole in each such object; fastening the each such object to such members by joining each such fastener with a fastened member.

According to a further embodiment, the tool is an Allen wrench.

According to a further embodiment, the tool is a ratchet tip.

According to a further embodiment, the tool has a substantially square ended tip for insertion.

According to a further embodiment, the tool is a screwdriver.

According to a further embodiment, the tool is a Phillips screwdriver.

According to a further embodiment, the tool is a square end screwdriver.

According to a further embodiment, the tool is a flathead screwdriver.

According to a further embodiment, the fastener is a threaded fastener.

According to a further embodiment, the fastener is a bolt.

According to a further embodiment, the fastener is a screw.

According to a further embodiment, the fastener is a non-threaded fastener.

According to a further embodiment, the member is metal.

According to a further embodiment, the member is stainless steel.

According to a further embodiment, the member is galvanized metal.

According to a further embodiment, the member is iron.

According to one application of the method, the one or more secured objects includes plywood.

According to a further application, the one or more secured objects includes a sheet of metal.

According to a further application, the one or more secured objects includes a sheet of plastic.

According to a further application, the one or more secured objects includes a sheet of fiberglass.

According to a further application, the one or more secured objects includes a rolldown shutter track.

According to a further application, the one or more secured objects includes a window covering track.

According to a further application, the one or more secured objects includes a shutter hinge.

According to a further application, the one or more secured objects includes a shutter mounting device.

According to a further application, the one or more secured objects includes a shutter.

According to a further application, the first structure is wood.

According to a further application, the first structure is wood window framing.

According to a further application, the first structure is metal.

According to a further application, the second structure is brick.

According to a further application, the second structure is rock.

According to a further application, the second structure is stucco.

According to a further application, the second structure is synthetic stucco.

According to a further application, the second structure is Exterior Insulation and Finish System.

According to a further application, the second structure is masonry.

According to a further application, the second structure is wood siding.

According to a further application, the second structure is aluminum siding.

According to a further application, the second structure is metal siding.

According to a further application, the second structure is vinyl siding.

According to one embodiment, there is provided, for windows in veneer walls of the type having wood frame structure surrounding the window opening and concealed behind the veneer, a method for attaching one or more objects to the wood frame structure, comprising the steps of: boring a plurality of holes through the veneer, each hole aligned with a surface of the wood frame structure; inserting an elongated member through each hole; fastening each member to the wood frame structure, by inserting a tool into the interior of each such member and manipulating the tool such that each such member is rotated; removing the tool from the member; aligning one or more holes in each object to be attached with a fastened member; placing a fastener within each hole in each such object; fastening the each such object to such members by joining each such fastener with a fastened member.

According to one embodiment, there is provided a method for attaching a sheet of material to a first structure where a second structure is between the first structure and the sheet of material, comprising the steps of: boring a plurality of holes through the second structure, each hole aligned with a surface of the first structure; inserting an elongated member through each hole; fastening each member to the first structure, by inserting a tool into the interior of each such member and manipulating the tool such that each such member is rotated; removing the tool from the member; aligning each of a plurality of holes in the sheet of material with a fastened member; placing a fastener within each hole in the sheet of material; fastening the sheet of material to such members by joining each such fastener with a fastened member.

According to one embodiment, there is provided, for windows in veneer walls of the type having wood frame structure surrounding the window opening and concealed behind the veneer, a method for attaching a sheet of material to the wood frame structure, comprising the steps of: boring a plurality of holes through the veneer, each hole aligned with a surface of the wood frame structure; inserting an elongated member through each hole; fastening each member to the wood frame structure, by inserting a tool into the interior of each such member and manipulating the tool such that each such member is rotated; removing the tool from the member; aligning each of a plurality of holes in the sheet of material with a fastened member; placing a fastener within each hole in the sheet of material; fastening the sheet of material to such members by joining each such fastener with a fastened member.

According to one embodiment, there is provided a device for securing an object to a first structure through a hole in a second structure, comprising an elongated member, the member having a first end and a second end, the member first end having threads, the member second end having an increasing diameter over at least a portion of the member second end length, the diameter increasing away from the member first end, the member second end further having an interior, the member second end interior being shaped and sized for receiving a fastener within the member second end interior, the member second end interior also being shaped and sized to receive a tool, such that the member is rotatable, in either direction, by manipulation of the received tool.

According to a further embodiment, the member first end further has a diameter, the member first end diameter being approximately equal to the diameter of the fastener.

According to a further embodiment, the rigidity of the elongated member is such that, when the member is attached to the first structure the weight of the secured object is substantially removed from the second structure.

According to a further embodiment, the member first end and member second join to form a shoulder.

According to a further embodiment, the member first end threads are wood screw threads, the wood screw threads being positioned such that the member screws into the first structure when rotated.

According to a further embodiment, the member first end threads are lag screw threads, the lag screw threads being positioned such that the member screws into the first structure when rotated.

According to a further embodiment, the member first end threads are machine screw threads, the machine screw threads being positioned such that the member screws into the first structure when rotated.

According to a further embodiment, the device further comprises a plug, the plug being shaped and sized such that it is securely received by the second end interior when said fastener is not in said second end interior.

According to a further embodiment, the plug has a cap, the cap being sized such that it substantially covers hole in the second structure when the plug is inserted into the second end interior.

According to a further embodiment, the tool has a square head.

According to a further embodiment, the fastener is a threaded fastener.

According to a further embodiment, the fastener is a non-threaded fastener.

According to a further embodiment, the member is stainless steel.

According to one embodiment, there is provided a device for securing an object to a first structure through a hole in a second structure, comprising: an elongated member, the member having a first end and a second end, the member second end having an interior; means for attaching the member to the first structure; means for securing an object to the member second end; and means for receiving a tool within the second end interior, such that the member is rotatable, in either direction, by manipulation of the tool.

According to a further embodiment, the member second end has an increasing diameter over at least a portion of the member second end length, the diameter increasing away from the member first end.

According to a further embodiment, wherein the tool has a square head.

According to one embodiment, there is provided a method for attaching one or more objects to a first structure where a second structure is between the first structure and the one or more objects, comprising the steps of: boring a plurality of holes through the second structure, each hole aligned with a surface of the first structure; inserting an elongated member through each hole, the elongated member having a flared end, the flared end being wider than the bored holes; fastening each member to the first structure, by inserting a tool into the interior of each such member and manipulating the tool such that each such member is rotated, such rotation causing the flared end to substantially close the bored hole; removing the tool from the member; aligning one or more holes in each object to be attached with a fastened member; placing a fastener within each hole in each such object; fastening the each such object to such members by joining each such fastener with a fastened member.

According to a further embodiment, the tool has a square head.

According to a further embodiment, the fastener is a threaded fastener.

According to a further embodiment, the fastener is a non-threaded fastener.

According to one embodiment, there is provided for windows in veneer walls having wood frame structure surrounding the window opening and concealed behind the veneer, a device for attaching a sheet of material to such wood frame structure through holes bored in the veneer, comprising an elongated member, the member having a first end and a second end, the member first end having threads for attaching the member to the wood frame structure, the member second end having an increasing diameter over at least a portion of the member second end length, the diameter increasing away from the member first end, the member second end further having an interior, the member second end being shaped and sized for receiving a fastener within the member second end interior, the member second end interior also being shaped and sized to receive a tool, such that the member is rotatable, in either direction, by manipulation of the received tool.

According to one embodiment, there is provided for windows in veneer walls having wood frame structure surrounding the window opening and concealed behind the veneer, a device for attaching a sheet of material to such wood frame structure through holes bored in the veneer, comprising: an elongated member, the member having a first end and a second end, the member first end having threads for attaching the member to the wood frame structure, the member second end having an increasing diameter over at least a portion of the member second end length, the diameter increasing away from the member first end, the member second end further having an interior; means for securing the sheet of material to the member second end; and means for receiving a tool within the second end interior, such that the member is rotatable, in either direction, by manipulation of the tool.

According to one embodiment, there is provided for windows in veneer walls having wood frame structure surrounding the window opening and concealed behind the veneer, a method for attaching one or more objects to the wood frame structure, comprising the steps of: boring a plurality of holes through the veneer, each hole aligned with a surface of the wood frame structure; inserting an elongated member through each hole, the elongated member having a flared end, the flared end being wider than the bored holes; fastening each member to the wood frame structure, by inserting a tool into the interior of each such member and manipulating the tool such that each such member is rotated, such rotation causing the flared end to substantially close the bored hole; removing the tool from the member; aligning one or more holes in each object to be attached with a fastened member; placing a fastener within each hole in each such object; fastening the each such object to such members by joining each such fastener with a fastened member.

According to one embodiment, there is provided a method for attaching a sheet of material to a first structure where a second structure is between the first structure and the sheet of material, comprising the steps of: boring a plurality of holes through the second structure, each hole aligned with a surface of the first structure; inserting an elongated member through each hole, the elongated member having a flared end, the flared end being wider than the bored holes; fastening each member to the first structure, by inserting a tool into the interior of each such member and manipulating the tool such that each such member is rotated, such rotation causing the flared end to substantially close the bored hole; removing the tool from the member; aligning each of a plurality of holes in the sheet of material with a fastened member; placing a fastener within each hole in the sheet of material; fastening the sheet of material to such members by joining each such fastener with a fastened member.

According to one embodiment, there is provided for windows in veneer walls having wood frame structure surrounding the window opening and concealed behind the veneer, a method for attaching a sheet of material to the wood frame structure, comprising the steps of: boring a plurality of holes through the veneer, each hole aligned with a surface of the wood frame structure; inserting an elongated member through each hole, the elongated member having a flared end, the flared end being wider than the bored holes; fastening each member to the wood frame structure, by inserting a tool into the interior of each such member and manipulating the tool such that each such member is rotated, such rotation causing the flared end to substantially close the bored hole; removing the tool from the member; aligning each of a plurality of holes in the sheet of material with a fastened member; placing a fastener within each hole in the sheet of material; fastening the sheet of material to such members by joining each such fastener with a fastened member.

DESCRIPTION OF THE DRAWINGS

These and other features, aspects, and advantages of the present invention will become better understood with regard to the following description, appended claims, and accompanying drawings where:

FIG. 2 is a side view of the device.

FIG. 3 is a top view of the device.

FIG. 4 is a cross-section of a portion of the device cut along cutting plane 4—4, as shown in FIG. 3.

FIG. 5 is a cross-section of a portion of a second embodiment of the device cut along cutting plane 5—5, as analogously shown in FIG. 3.

FIG. 6 is a side view of a threaded plastic plug.

DESCRIPTION OF THE INVENTION

Figure 1:
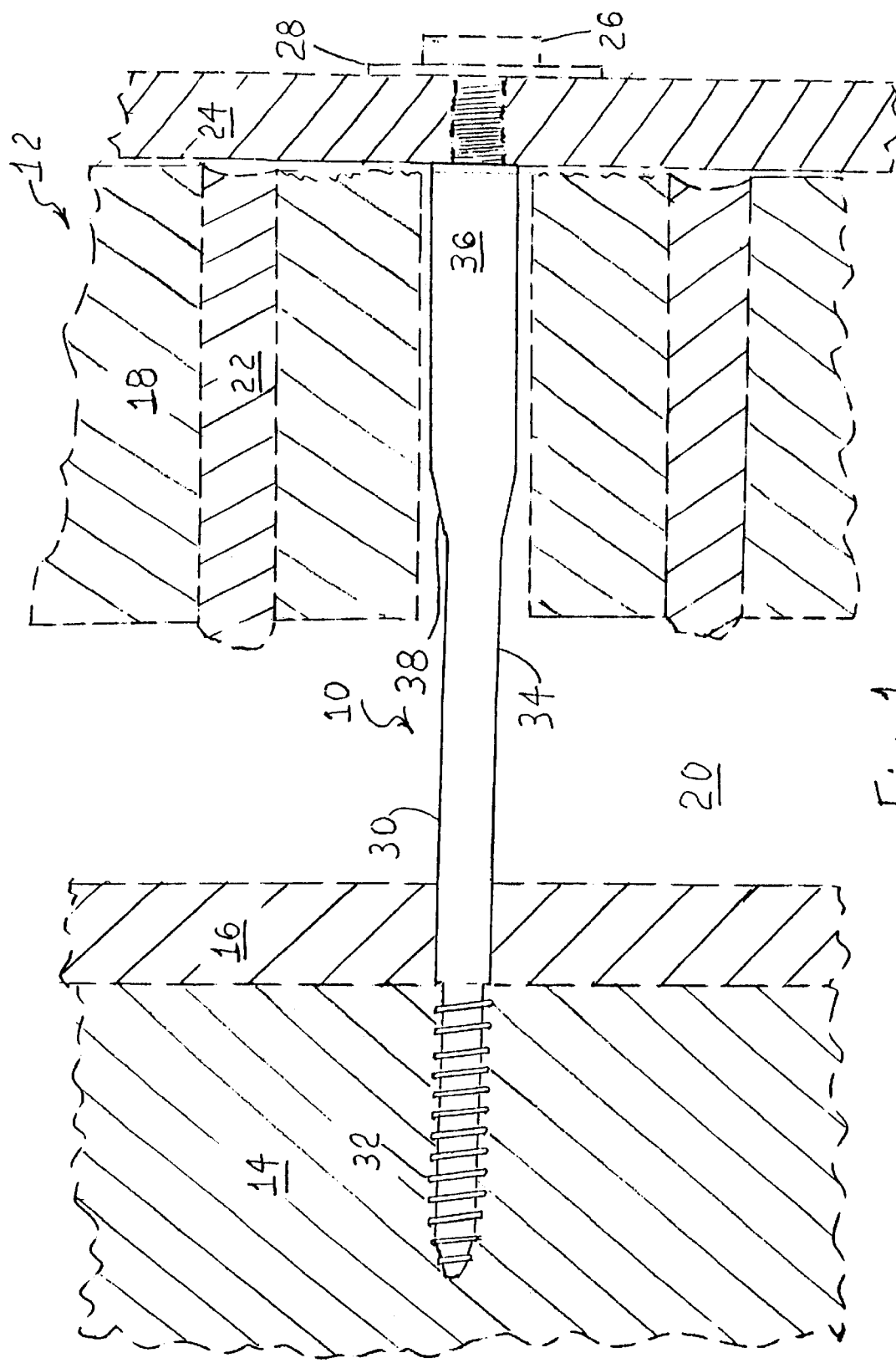
FIG. 1 depicts a view of the installed device in a brick veneer wall construction, with the wall materials cut away to show the device in place.

A first embodiment 10 of my invention is depicted in FIGS. 1–4. FIG. 1 illustrates the positioning of the device 10 in a brick veneer wall 12. The wood framing 14 is overlaid by sheathing 16 and is separated from the brick 18 by an air gap 20. The bricks 18 are separated by mortar 22. A sheet of protective material 24 is attached to the device 10 by a bolt 26 with washer 28. Although not depicted, the device 10 can be so positioned in numerous other decorative veneer materials, such as rock, stucco, synthetic stucco, Exterior Insulation and Finish System, masonry, wood siding, aluminum siding, metal siding, or vinyl siding. Similarly, the protective material can include sheets of metal, plastic, or fiberglass, as well as, shutters or shutter attachment hardware, such as shutter hinges, other shutter mounting devices, or tracks for rolldown shutters.

As shown in FIG. 2, the device 10 is an elongated member, having a first end 30 with wood screw threads 32. It is anticipated that a minimum of two inches of such threads will be required for satisfactory attachment to the wood framing 14. The first end 30 extends beyond the wood screw threads 32 as an unthreaded shaft 34. A second end 36 extends from the first end 30 through a shoulder 38 having a gradually increasing diameter. The unthreaded shaft 34 can be varied in length to make the device 10 applicable to other window covering applications involving other decorative veneers, as discussed above, in which the distance between the sheet of protective material 24 and the sheathing 16 varies significantly from the equivalent distance in a brick veneer construction. It is anticipated that the optimum diameter for the unthreaded shaft 34 is approximately three-eighths inches, while the diameter for the second end 36 is approximately five-eighths inches, although both smaller and larger diameters are contemplated to be applicable depending on the strength requirements of the application and the number of the devices 10 which may be involved in a single application. It is contemplated that the device 10 will be optimally configured when the diameter of the first end 30 is approximately the same as the diameter of the bolt 26.

Although not depicted, the wood screw threads 32 can be replaced by machine screw threads where the framing is metal.

For corrosion purposes, it is anticipated that stainless steel will be the optimum material for the device 10. Other materials are also suitable, such as iron, galvanized metal, and steel.

Materials used for the sheathing 16 vary greatly. It is contemplated that the sheathing will either be bored in manner similar to the brick 18, or it will be penetrated by the wood screw threads 32.

FIG. 3 depicts a top view of the device 10 revealing the interior 40. FIG. 4 depicts a side view of a cutaway of a portion of the device 10. The machine threaded bore 42 is sized to receive the bolt 26 such that approximately 2 inches of the bolt 26 is received within the interior 40. An Allen wrench hole 44 is sized to allow passage of the bolt 26. FIG. 5 depicts a second embodiment of the device 60 in which the threaded portion 62 and Allen wrench hole 64 are configured such that the bolt 26 does not pass through the Allen wrench hole 64.

Although not depicted, other tool-adaptable openings in the interior 40 can be used to receive tools other than Allen wrenches, such as ratchet tips, breakover tips, and screwdrivers, including flathead, Phillips, square end, and others.

FIG. 6 depicts a plastic plug 70 which may be securely received by the device 10 when the bolt 26 and the sheet of protective material 24 are removed.

Although the embodiments discussed above are discussed with relation to the protection of windows, the device is readily applicable to other situations where it is desired to attach an object to a first structure through holes in a second structure.

Figure 7:
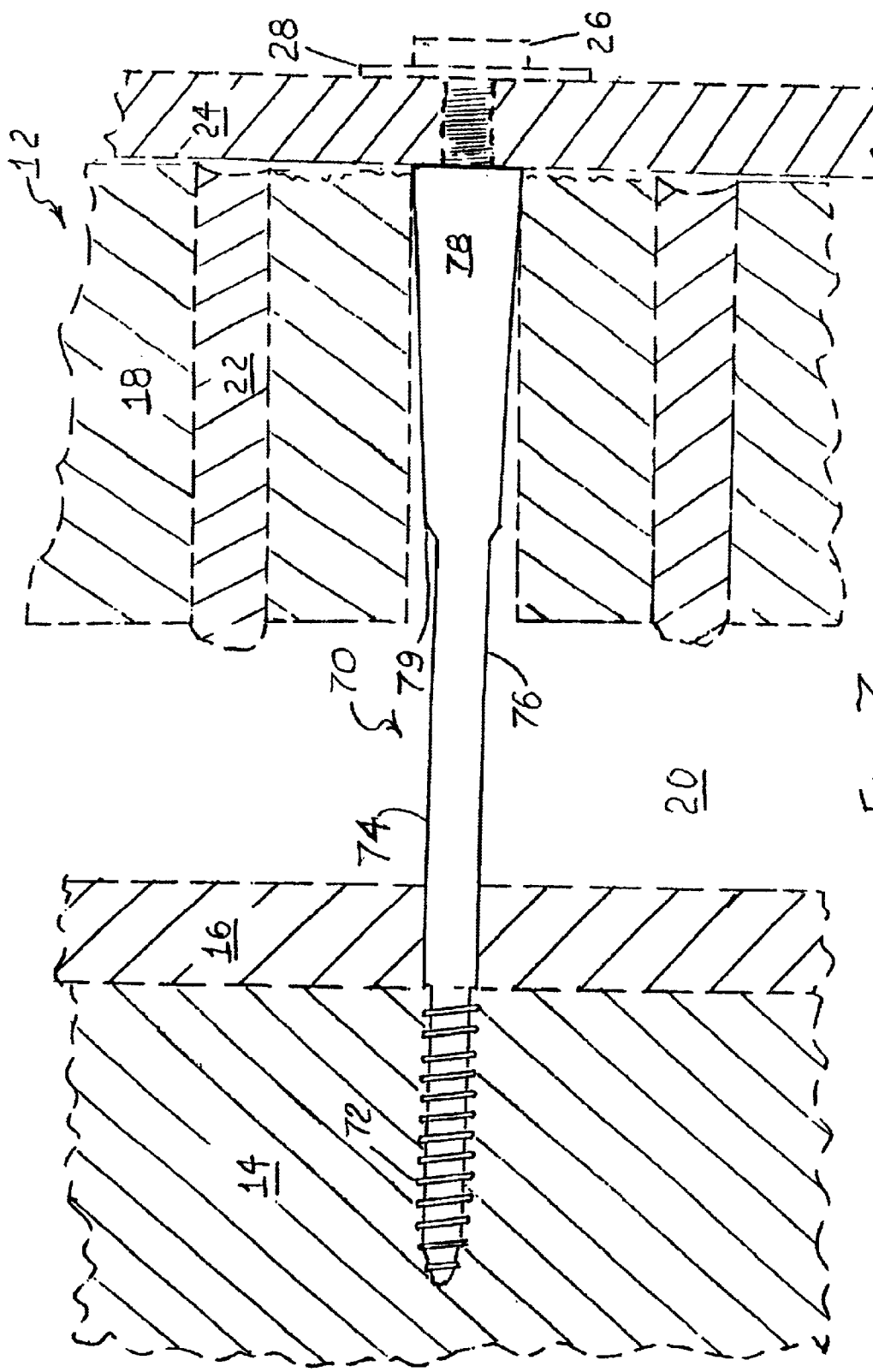
FIG. 7 depicts a view of an alternate embodiment of the device installed in a brick veneer wall construction, with the wall materials cut away to show the device in place.
Figure 8:
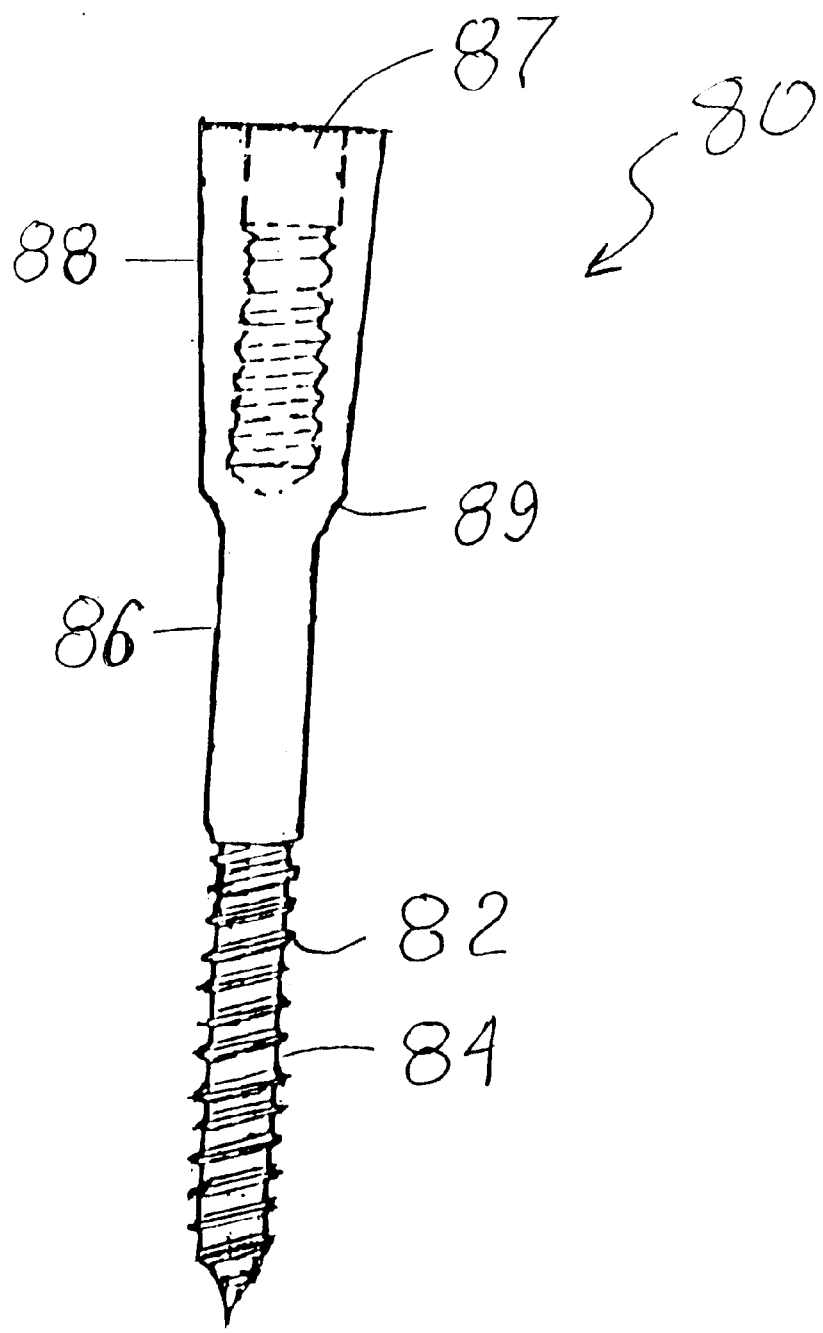
FIG. 8 is a side view of the device with the interior shown by hidden lines.

FIG. 7 and FIG. 8 depict embodiments of the device 70,80 that include threads 72,82, on a first end 74,84, an unthreaded shaft 76,86, a tool-adaptable opening 87 in a flared second end 78,88, attached to the unthreaded shaft 76,86, at shoulder 79,89. The flared second end 78,88 adds additional stability to the installation as the flare bears upon the brick 18, reducing or eliminating the movement of the installed flared second end 78,88. When installed the flared second end 78,88 also seals off the hole in the brick 18. As shown in FIG. 8, and as mentioned above, the tool-adaptable opening in the second end 78,88 can receive square head tools, such as a ⅜ inch breakover or power tool fitting. The flare can extend over all or part of the length of the second end 78,88.

Although the present invention has been described in considerable detail with reference to certain embodiments thereof, other embodiments are possible. The illustrated or described embodiments are given by way of example only and that other embodiments will occur to those of skill in the art without departing from the spirit of the invention. Accordingly, the spirit and scope of the claims should not be limited to the description of the embodiments contained herein.

I claim:

1. In combination with a veneer wall having wood frame structure surrounding a window opening, the wood frame structure being behind the veneer portion of the veneer wall, a device for attaching a sheet of material to such wood frame structure through holes bored in the veneer portion of the veneer wall such that substantially all the load of the sheet of material is supported by the device, the device comprising an elongated member, the member having a first end and a second end, the member first end having threads for attaching the member to the wood frame structure, the member second end having a taper having a diameter increasing away from the member first end, the taper substantially closing the bored hole in the veneer wall when the first end is screwed into the wood frame structure, the member second end further having an interior, the member second end interior being shaped and sized for receiving a fastener within the member second end interior, the member second end interior also being shaped and sized to receive a tool, such that the member is rotatable, in either direction, by manipulation of the received tool.

2. The device of claim 1, wherein the member first end further has a diameter, the member first end diameter being approximately equal to the diameter of the fastener.

3. The device of claim 1, wherein the rigidity of the elongated member is such that, when the member is attached to the first structure the weight of the secured object is substantially removed from the second structure.

4. The device of claim 1, wherein the member first end and member second join to form a shoulder.

5. The device of claim 1, wherein the member first end threads are wood screw threads, the wood screw threads being positioned such that the member screws into the first structure when rotated.

6. The device of claim 1, wherein the member first end threads are lag screw threads, the lag screw threads being positioned such that the member screws into the first structure when rotated.

7. The device of claim 1, wherein the member first end threads are machine screw threads, the machine screw threads being positioned such that the member screws into the first structure when rotated.

8. The device of claim 1, further comprising a plug, the plug being shaped and sized such that it is securely received by the second end interior when said fastener is not in said second end interior.

9. The device of claim 8, further comprising the plug, the plug having a cap, the cap being sized such that it substantially covers hole in the second structure when the plug is inserted into the second end interior.

10. The device of claim 1, wherein the tool has a square head.

11. The device of claim 1, wherein the fastener is a threaded fastener.

12. The device of claim 1, wherein the fastener is a non-threaded fastener.

13. The device of claim 1, wherein the member is stainless steel.

14. In combination with a veneer wall having wood frame structure surrounding a window opening, the wood frame structure being behind the veneer portion of the veneer wall, a device for attaching a sheet of material to such wood frame structure through holes bored in the veneer portion of the veneer wall such that substantially all the load of the sheet of material is supported by the device, the device comprising:

an elongated member, the member having a first end and a second end, the member second end having an interior, the member second end having a taper having a diameter increasing away from the member first end;

means for attaching the member to the wood frame structure, the member second end taper substantially closing the bored hole in the veneer wall when the first end is attached to the wood frame structure;

means for securing an object to the member second end; and means for receiving a tool within the second end interior, such that the member is rotatable, in either direction, by manipulation of the tool.

15. The device of claim 14, wherein the tool has a square head.

16. A method for attaching one or more objects to a first structure where a second structure is between the first structure and the one or more objects, comprising the steps of:

boring a plurality of holes through the second structure, each hole aligned with a surface of the first structure;

inserting an elongated member through each hole, the elongated member having a flared end, the flared end being wider than the bored holes;

fastening each member to the first structure, by inserting a tool into the interior of each such member and manipulating the tool such that each such member is rotated, such rotation causing the flared end to substantially close the bored hole, such that the flared end is substantially flush with the second structure, the member being rotatable, in either direction, by manipulation of the tool;

removing the tool from the member;

aligning one or more holes in each object to be attached with a fastened member;

placing a fastener within each hole in each such object;

fastening the each such object to such members by joining each such fastener with a fastened member.

17. The method of claim 16, wherein the tool has a square head.

18. The method of claim 16, wherein the fastener is a threaded fastener.

19. The method of claim 16, wherein the fastener is a non-threaded fastener.

* * * * *